(12) United States Patent
Lee

(10) Patent No.: US 11,519,532 B2
(45) Date of Patent: Dec. 6, 2022

(54) FITTING APPARATUS FOR CONNECTING PIPES

(71) Applicant: JUNGWOO METAL IND. CO., LTD., Yangju-si (KR)

(72) Inventor: Kwang Won Lee, Yangju-si (KR)

(73) Assignee: JUNGWOO METAL IND. CO., LTD., Yangju-si (KR)

(*) Notice: Subject to any disclaimer, the term of this patent is extended or adjusted under 35 U.S.C. 154(b) by 299 days.

(21) Appl. No.: 16/741,702

(22) Filed: Jan. 13, 2020

(65) Prior Publication Data

US 2021/0062944 A1 Mar. 4, 2021

(30) Foreign Application Priority Data

Aug. 30, 2019 (KR) .......................... 10-2019-0106960

(51) Int. Cl.
  *F16L 19/065* (2006.01)
  *F16J 15/02* (2006.01)
  *F16L 19/08* (2006.01)

(52) U.S. Cl.
  CPC ......... *F16L 19/0653* (2013.01); *F16J 15/021* (2013.01); *F16L 19/08* (2013.01)

(58) Field of Classification Search
  CPC ................................ F16L 19/08; F16J 15/021
  See application file for complete search history.

(56) References Cited

U.S. PATENT DOCUMENTS

| | | | | |
|---|---|---|---|---|
| 1,959,607 A | * | 5/1934 | Ernst | F16L 19/08 |
| | | | | 285/379 |
| 2,233,214 A | * | 2/1941 | Neil | F16L 19/0653 |
| | | | | 285/341 |
| 2,647,770 A | * | 8/1953 | Tollefsbol | F16L 27/125 |
| | | | | 277/910 |
| 3,831,954 A | * | 8/1974 | Longfellow | F16L 21/03 |
| | | | | 285/918 |
| 4,019,762 A | * | 4/1977 | Eidelberg | F16L 19/10 |
| | | | | 285/341 |
| 4,138,145 A | * | 2/1979 | Lawrence | F16L 19/061 |
| | | | | 285/23 |
| 4,309,050 A | * | 1/1982 | Legris | F16L 19/12 |
| | | | | 285/341 |

(Continued)

FOREIGN PATENT DOCUMENTS

| | | | | |
|---|---|---|---|---|
| CA | 2800360 A1 | * | 6/2013 | .......... B21D 39/046 |
| KR | 20-0382023 Y1 | | 4/2005 | |

*Primary Examiner* — Eugene G Byrd
(74) *Attorney, Agent, or Firm* — Revolution IP, PLLC

(57) ABSTRACT

A fitting apparatus for connecting pipes according to the present invention includes a fitting unit which includes a first body into which a first pipe is inserted and a second body which is connected to the first body to form a pipe insertion space therein together with the first body and into which a second pipe is inserted, wherein in the first body and the second body, a first recessed groove and a second recessed groove spaced apart inward from the first recessed groove are formed along an inner circumferential surface thereof, respectively, a compression member which is provided in the first recessed groove to compress and fix the first pipe or the second pipe, and a sealing member which is provided in the second recessed groove to maintain airtightness between the fitting unit and the first pipe or between the fitting unit and the second pipe.

13 Claims, 13 Drawing Sheets

(56) References Cited

U.S. PATENT DOCUMENTS

| | | | | |
|---|---|---|---|---|
| 5,070,767 A | * | 12/1991 | Yuda | F15B 15/1442 |
| | | | | 92/128 |
| 11,174,968 B2 | * | 11/2021 | Lee | F16L 17/02 |
| 2003/0038481 A1 | * | 2/2003 | Viegener | F16L 37/091 |
| | | | | 285/104 |
| 2011/0049875 A1 | * | 3/2011 | Stults | F16L 13/142 |
| | | | | 285/345 |
| 2013/0119655 A1 | * | 5/2013 | Jamison | F16L 17/02 |
| | | | | 285/295.1 |
| 2013/0167357 A1 | * | 7/2013 | Arment | F16L 13/142 |
| | | | | 148/684 |
| 2013/0207386 A1 | * | 8/2013 | Jamison | F16L 13/148 |
| | | | | 285/335 |
| 2015/0285420 A1 | * | 10/2015 | Stout | F16L 37/0845 |
| | | | | 285/346 |
| 2021/0396335 A1 | * | 12/2021 | Lee | F16J 15/104 |

\* cited by examiner

[FIG. 1]
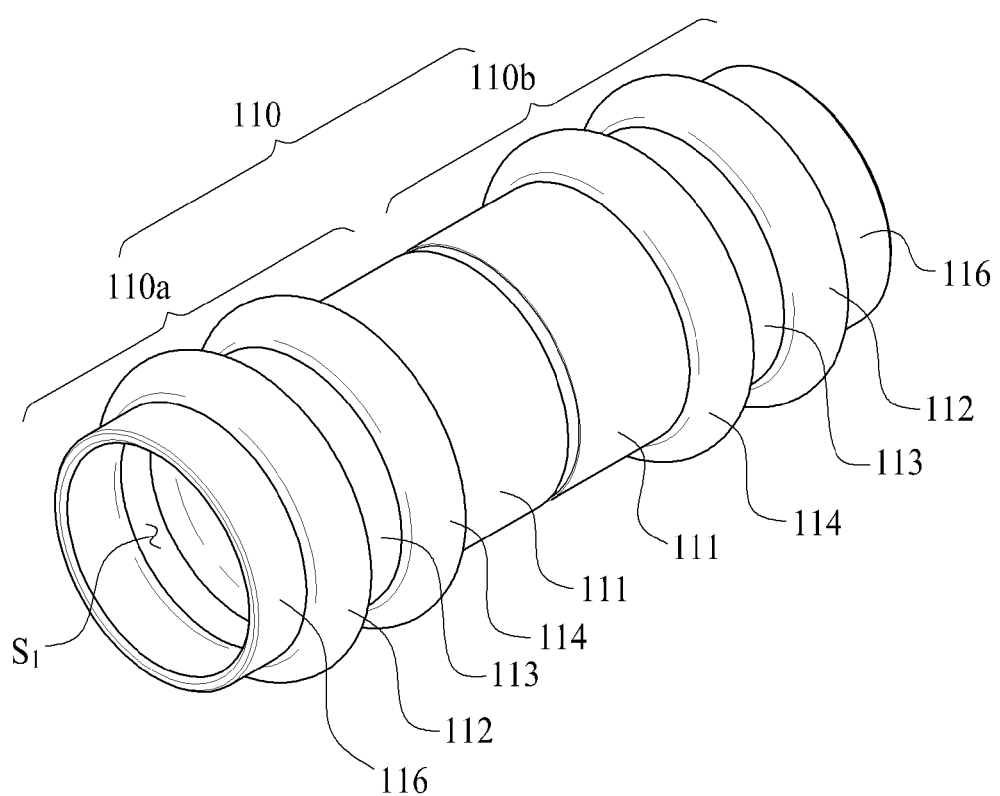

[FIG. 2]
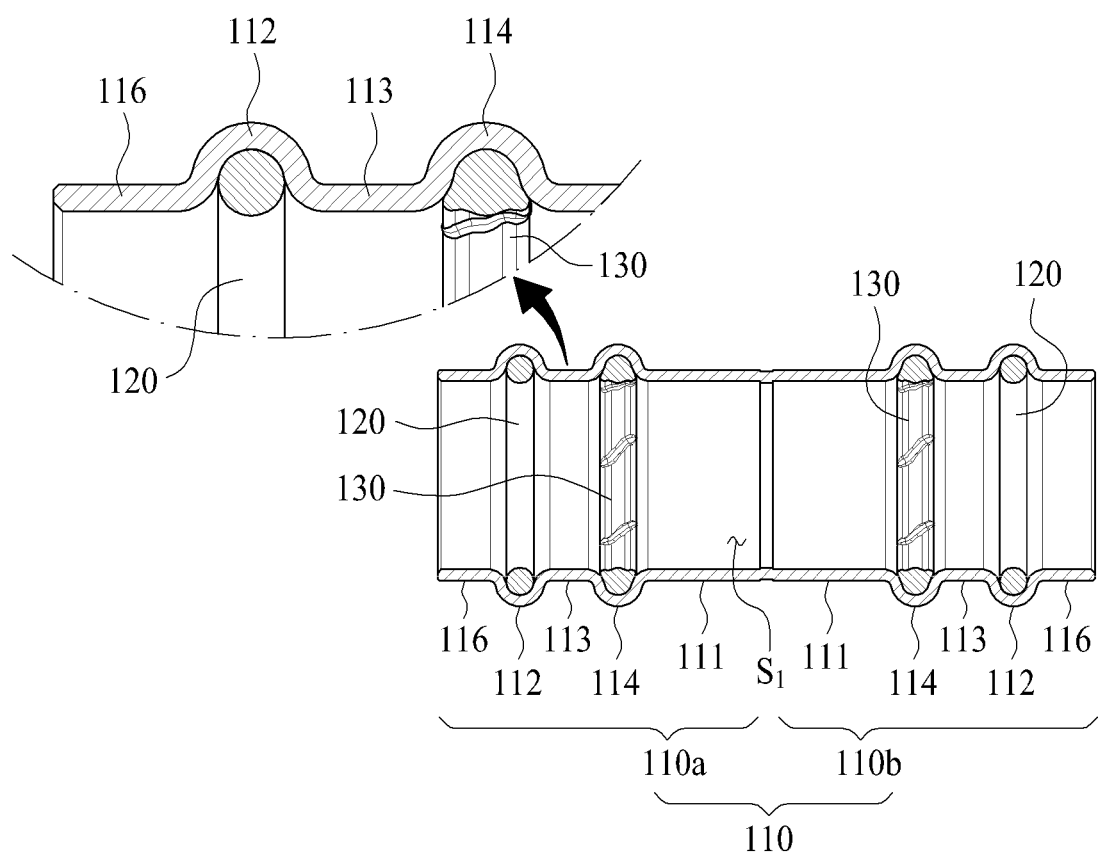

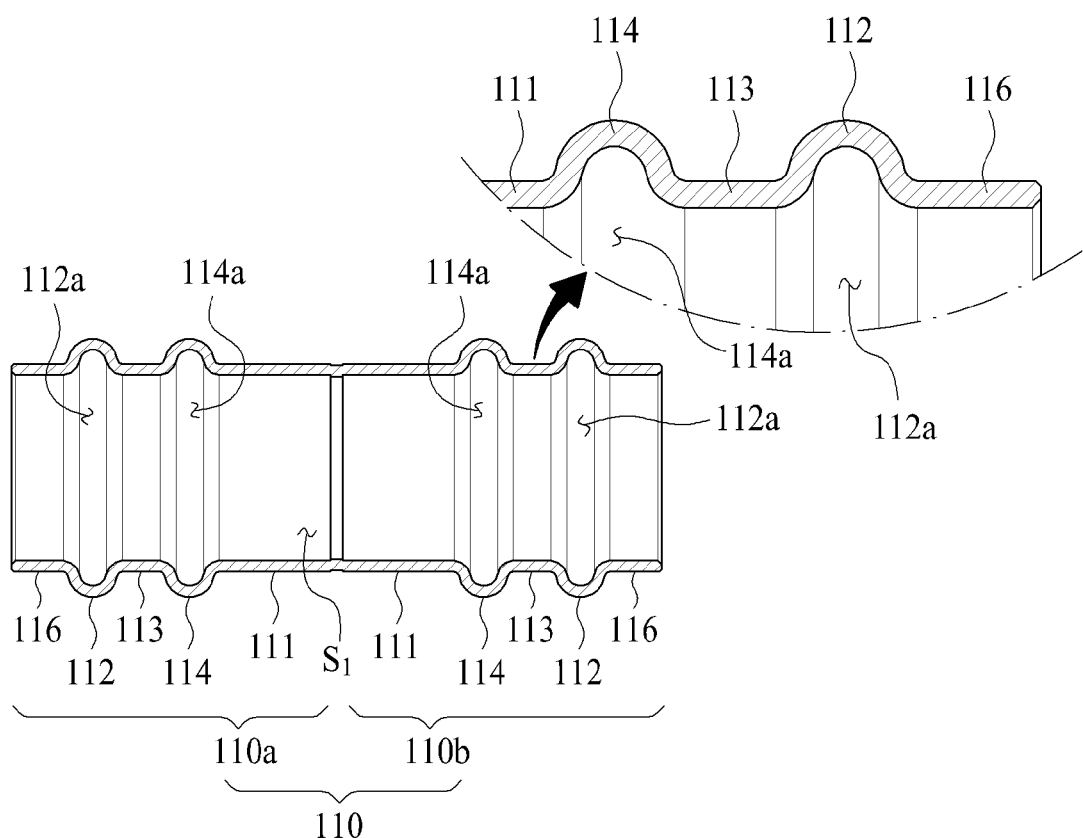
[FIG. 3]

【FIG. 4】
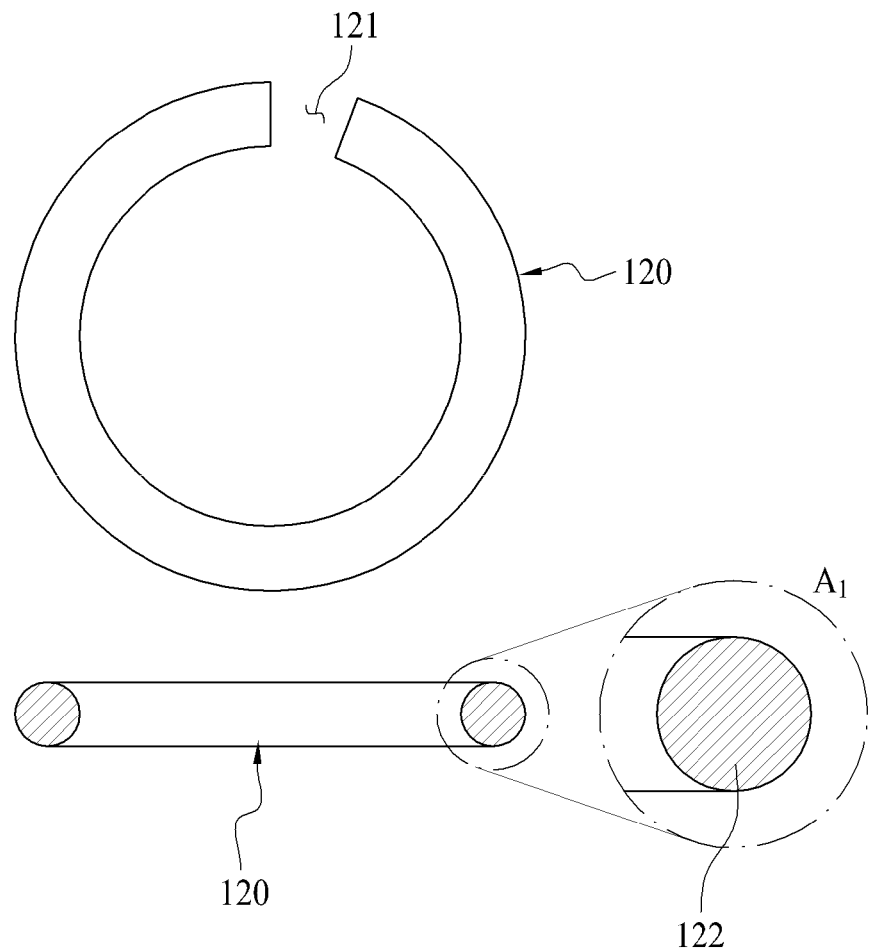
【FIG. 5】
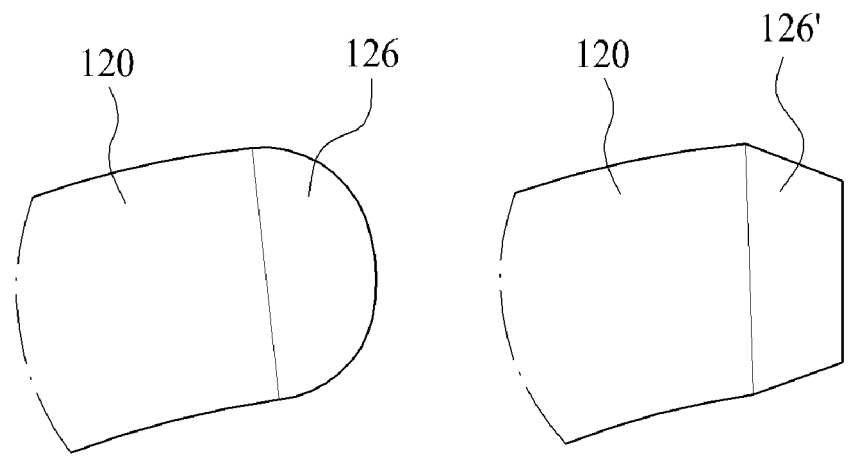

[FIG. 6]
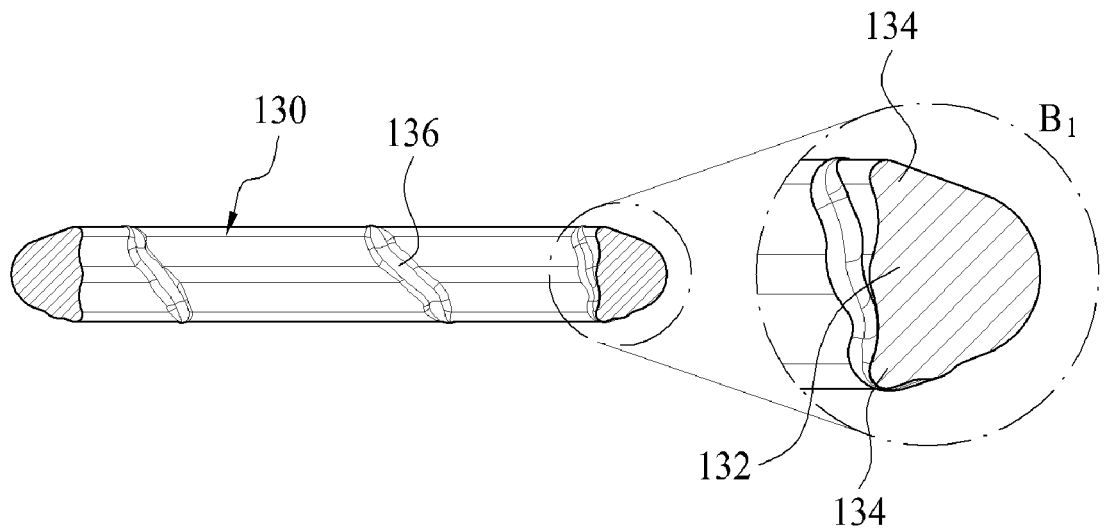
[FIG. 7]
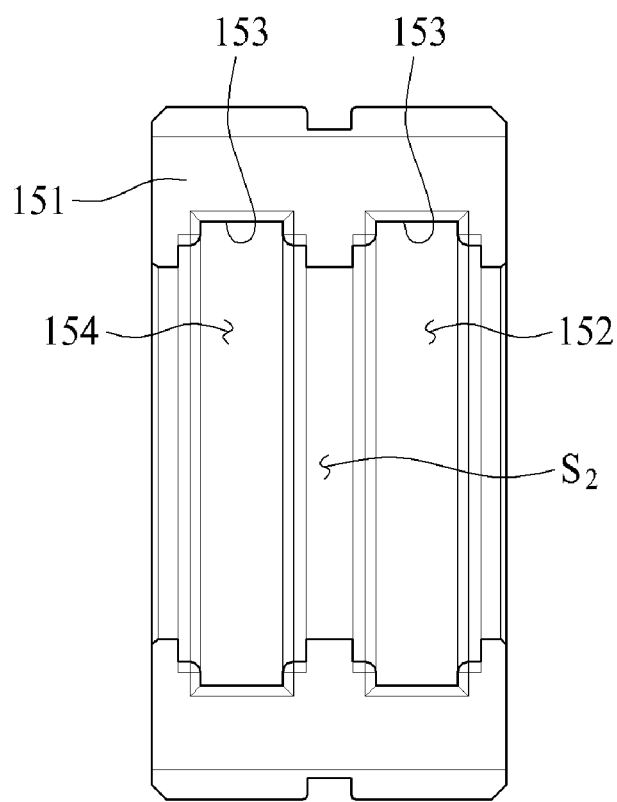

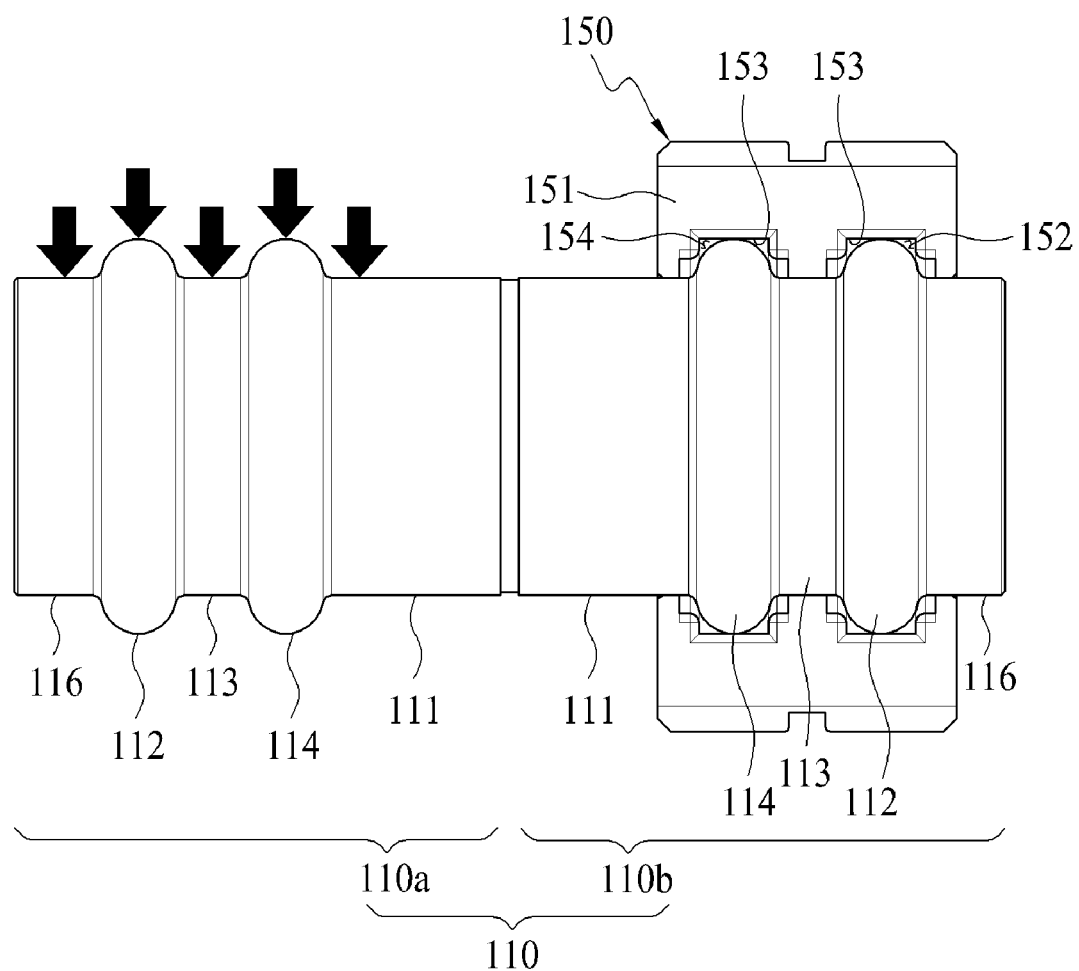
[FIG. 8]

[FIG. 9]
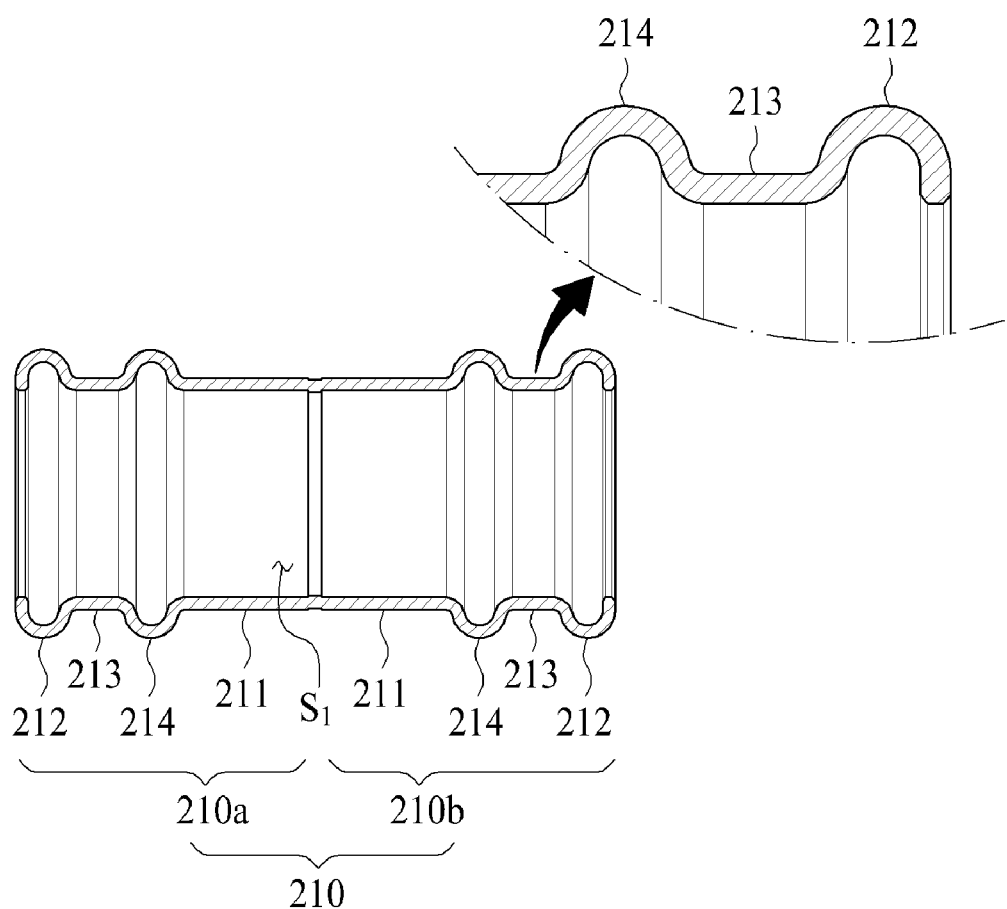

【FIG. 10】
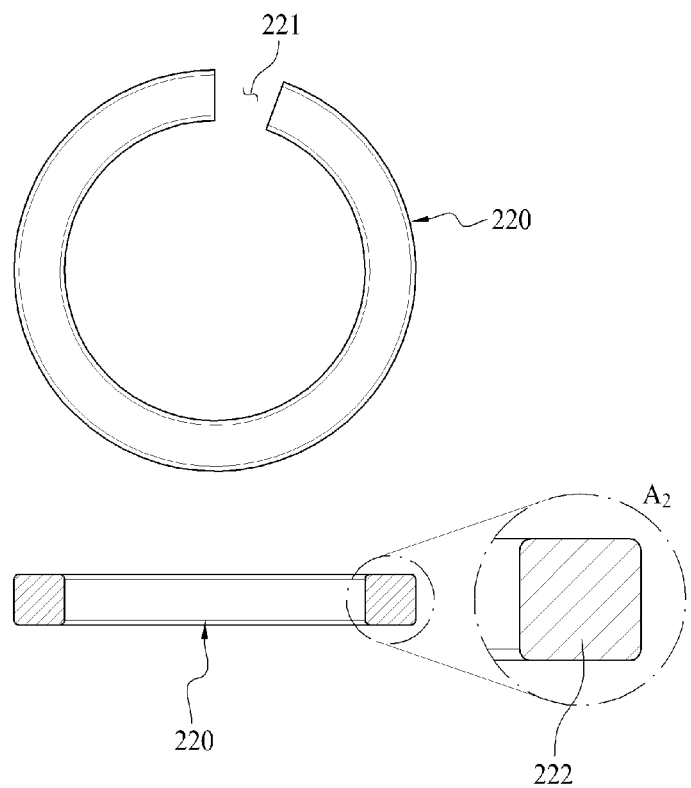
【FIG. 11】
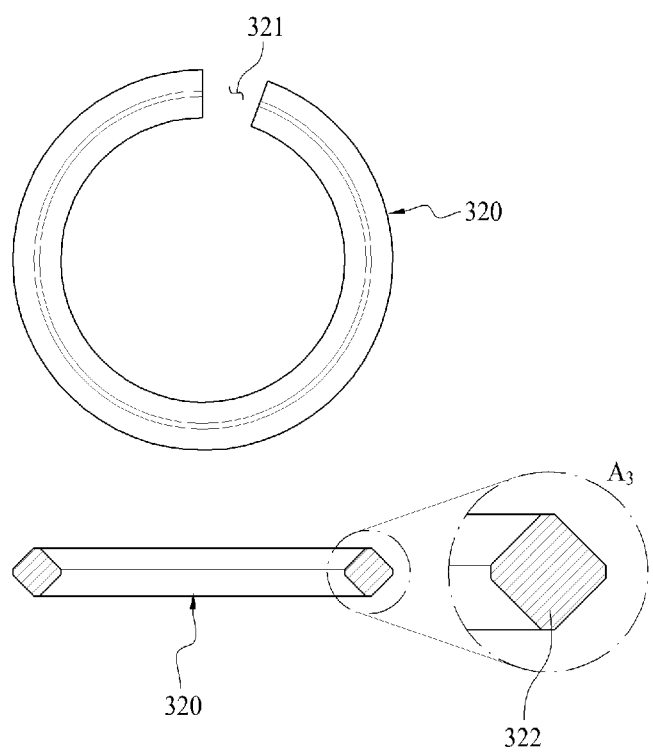

[FIG. 12]
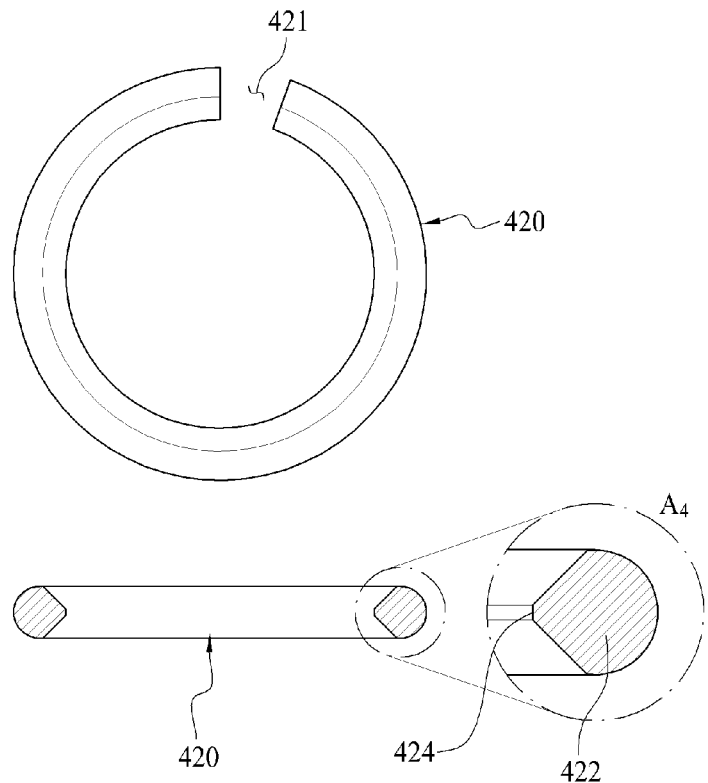
[FIG. 13]
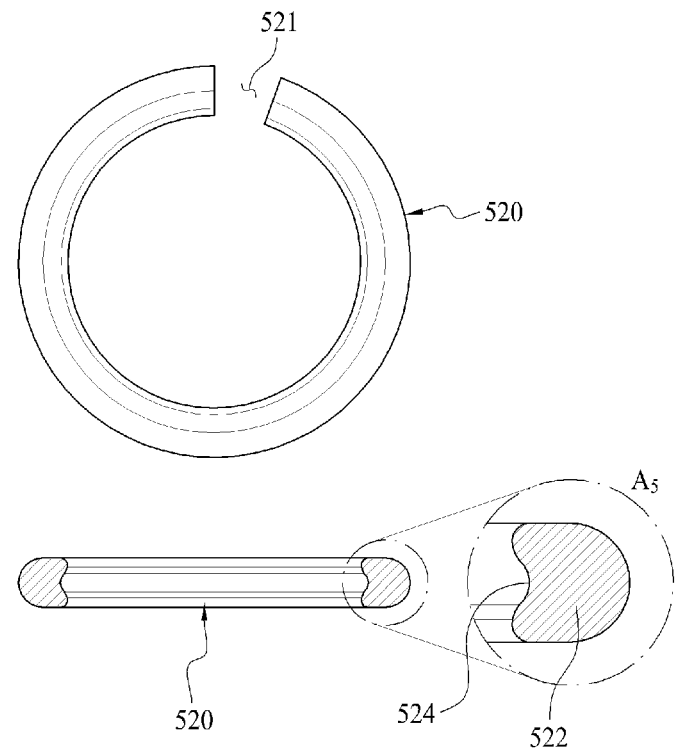

[FIG. 14]
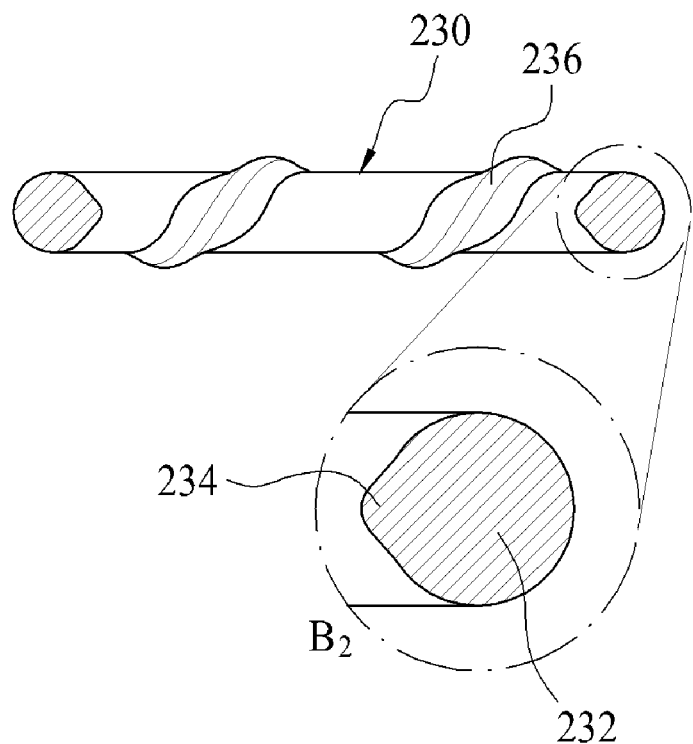
[FIG. 15]
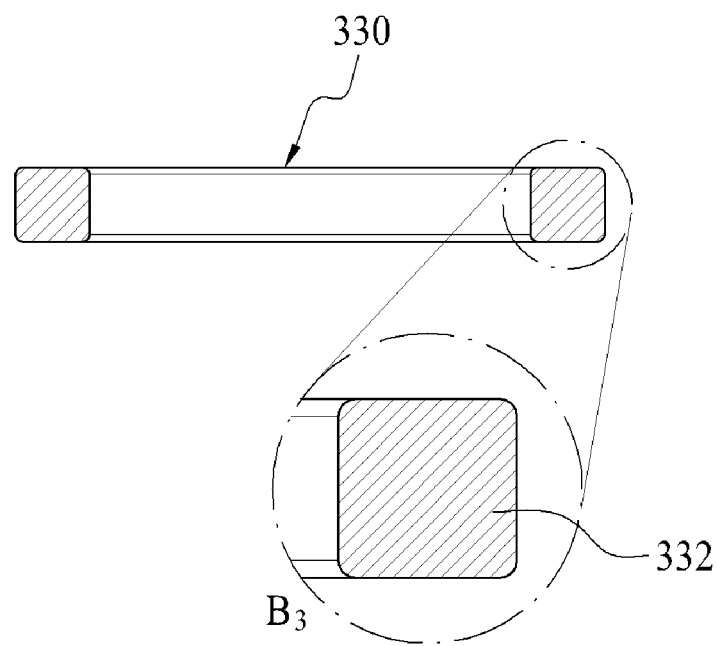

[FIG. 16]
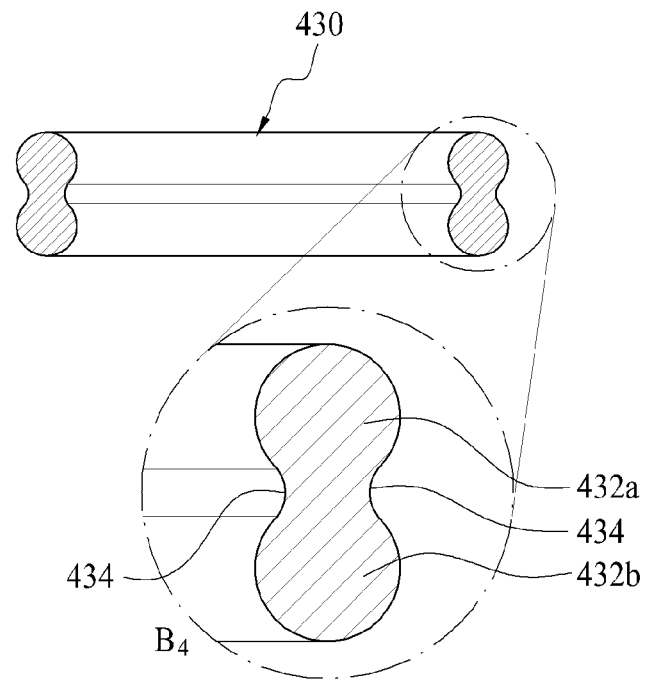
[FIG. 17]
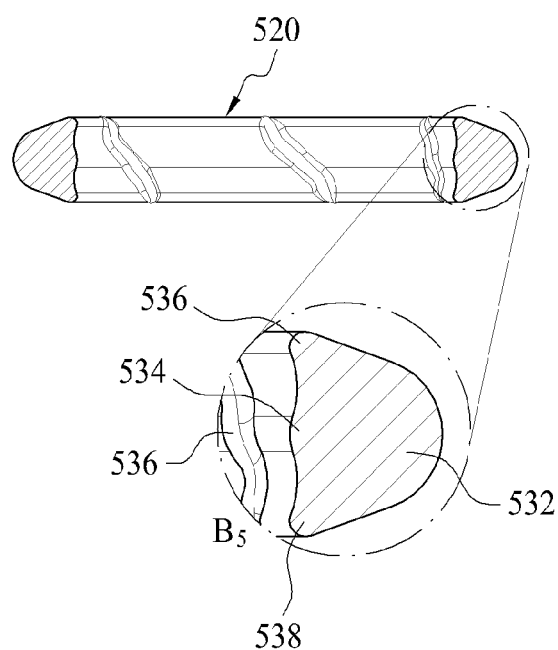

[FIG. 18]
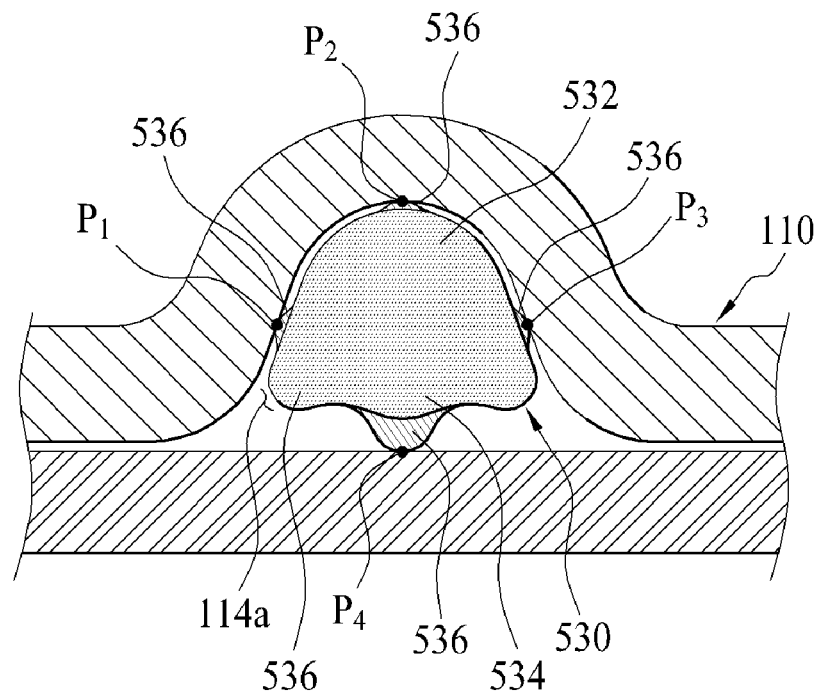
[FIG. 19]
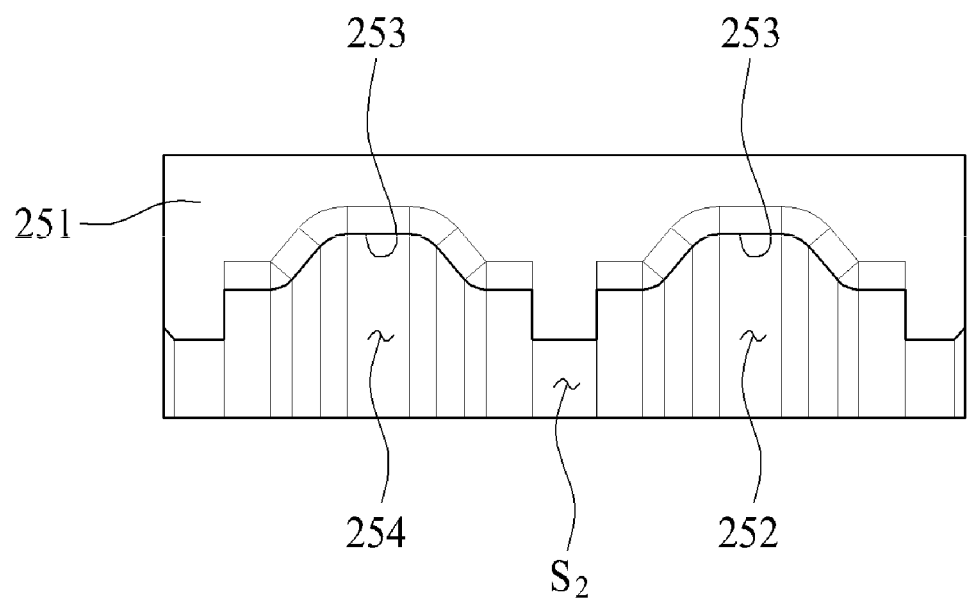

[FIG. 20]
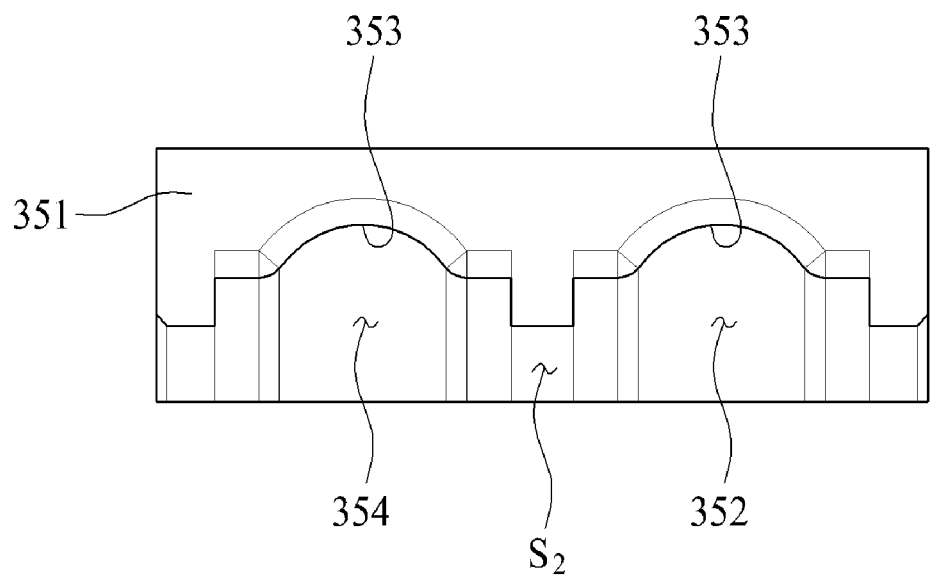

FITTING APPARATUS FOR CONNECTING PIPES

CROSS-REFERENCE TO RELATED APPLICATION

This application claims under 35 U.S.C. § 119(a) the benefit of Korean Patent Application No. 10-2019-0106960 filed on Aug. 30, 2019, the entire contents of which are incorporated herein by reference.

BACKGROUND

(a) Technical Field

The present invention relates to a fitting apparatus for connecting pipes, and more particularly, to a fitting apparatus for connecting pipes, which firmly connects a pair of pipes to each other so as to maintain airtightness.

(b) Background Art

In general, pipe connectors are used to connect various types of pipes that are constructed in construction and civil engineering, and these pipe connectors are formed in various shapes according to the size and type of pipe.

In the case of a large-diameter pipe connector, a receiving space is formed inside a connector into which the pipe is inserted, and the receiving space is provided with a water stop ring and a grip ring. Accordingly, the pipe is inserted into the connector and then the grip ring is compressed to penetrate into the outer surface of the pipe and fix the pipe.

In the case of a small-diameter pipe connector, a method is used in which a water stop ring is inserted into a connector into which a pipe is inserted, and then the pipe is inserted and connected. In this case, the water stop ring presses the outer surface of the pipe to prevent leakage of a fluid flowing into the pipe.

However, since the conventional small-diameter pipe connector is formed so that the water stop ring has elasticity, shape deformation occurs easily due to a load of the pipe, an angle change by an external force, and the like, and thus it is difficult to stably fix the pipe.

In order to compensate for this problem, a separate fixing apparatus has been additionally installed at a connection part between the pipes, but the fixing apparatus is not only troublesome to be installed, but also increases the time and cost required for construction.

Therefore, there is a need for a method for solving such problems.

PRIOR ART DOCUMENT

Patent Document

Korean Utility Model No. 20-0382023

SUMMARY OF THE DISCLOSURE

The present invention has been made in an effort to solve the above-described problems associated with prior art and to provide a fitting apparatus for connecting pipes that can greatly improve a water stop force and firmly fix the pipes.

Further, the present invention has been made in an effort to provide a fitting apparatus for connecting pipes that is simple in configuration and easy to be installed.

The objects of the present invention are not limited to the aforementioned objects, and other objects, which are not mentioned above, will be apparent to those skilled in the art from the following description.

In order to achieve the objects of the present invention, a fitting apparatus for connecting pipes includes a fitting unit which includes a first body into which a first pipe is inserted and a second body which is connected to the first body to form a pipe insertion space therein together with the first body and into which a second pipe is inserted, wherein in the first body and the second body, a first recessed groove and a second recessed groove spaced apart inward from the first recessed groove are formed along an inner circumferential surface thereof, respectively, a compression member which is provided in the first recessed groove to compress and fix the first pipe or the second pipe, and a sealing member which is provided in the second recessed groove to maintain airtightness between the fitting unit and the first pipe or between the fitting unit and the second pipe.

The first body and the second body may include a first member mounting part having the first recessed groove formed on the inner circumferential surface thereof, a second member mounting part having the second recessed groove formed on the inner circumferential surface thereof, a groove separation part formed between the first member mounting part and the second member mounting part, and an inner extension part which extends inward from the second member mounting part to connect the first body and the second body to each other.

The first body and the second body may further include an outer extension part extending outward from the first member mounting part.

The first member mounting part and the second member mounting part may be formed to have outer diameters larger than those of the groove separation part and the inner extension part.

A length of the inner extension part may be formed longer than the length of the groove separation part.

The compression member may be seated on the first recessed groove and formed to have a non-closed shape in which a part of the circumference is opened to reduce a diameter by compression applied to the outer circumferential surface of the fitting unit and compress the first pipe or the second pipe.

A longitudinal section of the compression member may include a main compression region having a predetermined shape.

The longitudinal section of the compression member may further include an auxiliary compression region protruding toward the center of the pipe insertion space from the main compression region.

The longitudinal section of the compression member may further include an auxiliary groove recessed inward from the main compression region.

The sealing member may be formed to have elasticity to be seated on the second recessed groove and formed in a ring shape.

The sealing member may include an auxiliary sealing protrusion protruding spirally along the outer surface of the sealing member.

A longitudinal section of the sealing member may include a main sealing region having a predetermined shape.

The longitudinal section of the sealing member may further include an auxiliary sealing region protruding outward from the main sealing region.

The longitudinal section of the sealing member may be formed so that a pair of main sealing regions is connected to each other.

The fitting apparatus for connecting the pipes may further include a pressing unit which is mounted to cover an outer circumferential surface of the first body or the second body and press the outer circumferential surface of the first body or the second body.

The pressing unit may include a pressing body which has a fitting unit insertion space into which the first body or the second body is inserted and covers and presses the outer circumferential surface of the first body or the second body.

The first member mounting part and the second member mounting part may be formed to have outer diameters larger than those of the groove separation part and the inner extension part, and in the pressing body, a first seating groove on which the first member mounting part is seated and a second seating groove on which the second member mounting part is seated may be formed along an inner circumferential surface thereof.

The fitting apparatus for connecting the pipes of the present invention for solving the above problems has the following effects.

First, the fitting apparatus of the present invention has advantages of stably fixing the pipes by the compression member and the sealing member which are in contact with each pipe fixed to the fitting unit and greatly improving the airtightness.

Second, since the fitting apparatus of the present invention is not provided with a separate fixing device or the like and thus is simple in configuration and an installation method thereof is very easy, the fitting apparatus has an advantage of greatly reducing the time and cost required for construction.

The effects of the present invention are not limited to the aforementioned effects, and other effects, which are not mentioned above, will be apparent to those skilled in the art from the description of the claims.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein:

FIG. 1 is a view illustrating an external appearance of a fitting apparatus for connecting pipes according to an embodiment of the present invention;

FIG. 2 is a view illustrating an internal structure of the fitting apparatus for connecting the pipes according to an embodiment of the present invention;

FIG. 3 is a view illustrating an appearance of a fitting unit in the fitting apparatus for connecting the pipes according to an embodiment of the present invention;

FIGS. 4 and 5 are views illustrating an appearance of a compression member in the fitting apparatus for connecting the pipes according to an embodiment of the present invention;

FIG. 6 is a view illustrating an appearance of a sealing member in the fitting apparatus for connecting the pipes according to an embodiment of the present invention;

FIG. 7 is a view illustrating an appearance of a pressing unit in the fitting apparatus for connecting the pipes according to an embodiment of the present invention;

FIG. 8 is a view illustrating an appearance in which the pressing unit is mounted on the fitting unit in the fitting apparatus for connecting the pipes according to an embodiment of the present invention;

FIG. 9 is a view illustrating another embodiment of a fitting unit in a fitting apparatus for connecting pipes of the present invention;

FIGS. 10 to 13 are views illustrating other embodiments of compression members in the fitting apparatus for connecting the pipes of the present invention;

FIGS. 14 to 18 are views illustrating other embodiments of sealing members in the fitting apparatus for connecting the pipes of the present invention; and FIGS. 19 to 20 are views illustrating other embodiments of pressing units in the fitting apparatus for connecting the pipes of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, preferred embodiments of the present invention, in which the objects of the present invention can be specifically realized, will be described in detail with reference to the accompanying drawings. In describing the embodiments, the same name and the same reference numerals are used for the same components, and an additional description thereof will be omitted.

FIG. 1 is a view illustrating an external appearance of a fitting apparatus for connecting pipes according to an embodiment of the present invention and FIG. 2 is a view illustrating an internal structure of the fitting apparatus for connecting the pipes according to an embodiment of the present invention.

In addition, FIG. 3 is a view illustrating an appearance of a fitting unit 110 in the fitting apparatus for connecting the pipes according to an embodiment of the present invention.

As illustrated in FIGS. 1 to 3, the fitting apparatus for connecting the pipes according to an embodiment of the present invention includes a fitting unit 110, a compression member 120, and a sealing member 130.

The fitting unit 110 has a pipe insertion space S1 formed therein so that different pipes may be inserted into both sides thereof and is formed in a tubular shape as a whole.

Particularly, in the present embodiment, the fitting unit 110 includes a first body 110a into which a first pipe is inserted and a second body 110b into which a second pipe is inserted. The first body 110a and the second body 110b have a symmetrical shape in both directions based on a central line of the fitting unit 110 and have the pipe insertion space S1 formed therein.

In addition, in each of the first body 110a and the second body 110b, a first recessed groove 112a and a second recessed groove 114a spaced apart inward from the first recessed groove 112a are formed along an inner circumferential surface thereof, respectively. At this time, the compression member 120 is provided in the first recessed groove 112a, and the sealing member 130 is provided in the second recessed groove 114a.

More specifically, in the present embodiment, each of the first body 110a and the second body 110b has a form including a first member mounting part 112 having the first recessed groove 112a formed on an inner circumferential surface thereof, a second member mounting part 114 having the second recessed groove 114a formed on an inner circumferential surface thereof, a groove separation part 113 formed between the first member mounting part 112 and the second member mounting part 114, an inner extension part 111 extending inward from the second member mounting part 114 to connect the first body 110a and the second body 110b to each other, and an outer extension part 116 extending outward from the first member mounting part 112.

That is, the first body 110a and the second body 110b have a form in which the inner extension part 111, the second member mounting part 114, the groove separation part 113, the first member mounting part 112, and the outer extension part 116 are sequentially connected to each other outward from the center of the fitting unit 110.

In addition, in the present embodiment, the first member mounting part 112 and the second member mounting part 114 are formed to have outer diameters larger than those of the groove separation part 113, the outer extension part 116, and the inner extension part 111. Accordingly, the fitting unit 110 is formed in a tubular shape as a whole, and has a form in which a plurality of protrusions is formed on an outer circumferential surface thereof.

In the present embodiment, the first member mounting part 112 and the second member mounting part 114 are formed in the first body 110a and the second body 110b, respectively, but the present invention is not limited thereto, and the first member mounting part 112 and the second member mounting part 114 may also be formed in plural. In this case, the compression member 120 or the sealing member 130 may also be provided in plural.

In addition, in the present embodiment, the length of the inner extension part 111 may be formed longer than the length of the groove separation part 113. The reason as such is to form a wider internal space of the inner extension part 111 to prevent an end of the pipe inserted into the fitting unit 110 from being deformed by a pressing force of the pressing unit 150 (see FIG. 8) to be described below.

In addition, a ring-shaped protrusion protruding by a predetermined height may be formed on the inner circumferential surface of the center of the fitting unit 110 in which the first body 110a and the second body 110b are connected to each other. This is to limit a maximum insertion depth of the first pipe and the second pipe.

FIGS. 4 and 5 are views illustrating an appearance of the compression member 120 in the fitting apparatus for connecting the pipes according to an embodiment of the present invention.

The compression member 120 is a component which is provided in the first recessed groove 112a to press and fix the first pipe or the second pipe.

As illustrated in FIGS. 4 and 5, the compression member 120 is seated on the first recessed groove 112a and is formed in a non-closed shape in which a part of the circumference is opened. That is, the compression member 120 is formed in an unfinished ring shape in which an opening 121 is formed in a part of the entire circumference.

Accordingly, the compression member 120 may be deformed by the compression applied to the outer circumferential surface of the fitting unit 110 to reduce a diameter thereof, and press and fix the first pipe or the second pipe inserted into the fitting unit 110.

At this time, the compression member 120 may be formed of a metallic material, and the first pipe or the second pipe is plastically deformed by the compression member 120 to be fixed so as not to be separated from the fitting unit 110.

In addition, a longitudinal section of the compression member 120 includes a main compression region 122 having a predetermined shape. In the present embodiment, the main compression region 122 has a circular shape.

In addition, both ends 126 and 126' based on the opening 121 may also be finished in a hemispherical round form as illustrated in the left side of FIG. 5, or may also be finished in a chamfered form as illustrated in the right side of FIG. 5. This is to prevent the ends 126 and 126' of the compression member 120 from damaging the first pipe or the second pipe.

FIG. 6 is a view illustrating an appearance of the sealing member 130 in the fitting apparatus for connecting the pipes according to an embodiment of the present invention.

The sealing member 130 is a component which is provided in the second recessed groove 114a to maintain the airtightness between the fitting unit 110 and the first pipe, or between the fitting unit 110 and the second pipe.

The reason why the sealing member 130 is provided inside the compression member 120 described above is to prevent a fluid flowing between the first pipe and the second pipe from being leaked toward the compression member 120. That is, the sealing member 130 is provided close to the center side of the fitting unit 110 and serves to prevent the leakage of the fluid in advance.

As illustrated in FIG. 6, the sealing member 130 is formed to have elasticity, seated on the second recessed groove 114a, and formed in a ring shape as a whole.

Particularly, in the present embodiment, the sealing member 130 has a form including an auxiliary sealing protrusion 136 protruding in a spiral form along the outer surface of the sealing member 130. The auxiliary sealing protrusion 136 is to allow the sealing member 130 to have a greater water stop force between the fitting unit 110 and the first pipe, or between the fitting unit 110 and the second pipe.

In addition, the longitudinal section of the sealing member 130 may include a main sealing region 132 having a predetermined shape and an auxiliary sealing region 134 protruding outward from the main sealing region 132.

In the present embodiment, the main sealing region 132 is formed to have a circular shape, and the auxiliary sealing region 134 has a shape in which a pair of auxiliary sealing regions protrudes to both sides of the main sealing region 132. Such a longitudinal section shape allows the sealing member 130 to be more strongly in close contact with the first pipe or the second pipe, thereby improving the water stop force.

In general, the pipe may be scratched during use in manufacturing, transportation, and construction sites, and an allowable range thereof is 22% of a tube thickness. However, since the pipe is sensitive to the water stop force and the durability when applied to an actual product, there is a problem that it is difficult to maintain a desired water stop force when the pipe has a scratch of 22% thickness.

Particularly, a refrigerant (such as helium) used in an air conditioning system of a fluid passing through the pipe is sensitive to scratches, thereby increasing a possibility of leakage.

As a result, 22%-thick scratches are not allowed during use of actual products, but more stringent standards are applied.

However, since the auxiliary sealing region 134 and the auxiliary sealing member 136 are provided together with the main sealing region 132 like the sealing member 130 of the present invention, the compressive force with the pipe may be increased to maintain the water stop force.

That is, the present invention has an effect of maintaining the water stop force even if there are scratches on the pipe.

FIG. 7 is a view illustrating an appearance of the pressing unit 150 in the fitting apparatus for connecting the pipes according to an embodiment of the present invention and FIG. 8 is a view illustrating an appearance in which the pressing unit 150 is mounted on the fitting unit 110 in the fitting apparatus for connecting the pipes according to an embodiment of the present invention.

As illustrated in FIGS. 7 and 8, the fitting apparatus for connecting the pipes according to an embodiment of the present invention may further include the pressing unit 150.

The pressing unit 150 is a component which is mounted to cover the outer circumferential surface of the first body 110a or the second body 110b, presses the outer circumferential surface of the first body 110a or the second body 110b to deform the compression member 120 provided inside the fitting unit 110, and applies the pressure to the first pipe or the second pipe to strongly constrain the first pipe or the second pipe.

In the present embodiment, the pressing unit 150 includes a pressing body 151 which has a fitting unit insertion space S2 into which the first body 110a or the second body 110b is inserted, and covers and presses the outer circumferential surface of the first body 110a or the second body 110b.

In addition, the pressing body 151 has a first seating groove 152 on which the first member mounting part 112 of the fitting unit 110 is seated, and a second seating groove 154 on which the second member mounting part 114 is seated, which are formed along the inner circumferential surface thereof.

Therefore, while the pressing body 151 is mounted on the fitting unit 110 as illustrated in FIG. 8, the pressing body 151 is in contact with the inner extension part 111, the second member mounting part 114, the groove separation part 113, the first member mounting part 112, and the outer extension part 116 of the first body 110a or the second body 110b, respectively, to apply the pressing force. The pressing unit 150 of such a form may increase a fastening force so that the first pipe or the second pipe is not separated.

Particularly, in the present embodiment, the pressing unit 150 is formed so as to press only a part of the inner extension part 111 to prevent the end of the first pipe or the second pipe from being deformed.

In addition, an inner circumferential surface 153 of the first seating groove 152 and the second seating groove 154 may have various cross-sectional shapes. In the present embodiment, the cross section of the inner circumferential surface 153 of the first seating groove 152 and the second seating groove 154 has a flat shape.

As described above, respective components of the fitting apparatus for connecting the pipes of the present invention have been described, and hereinafter, various embodiments of respective components described above will be described in sequence.

First, FIG. 9 is a view illustrating another embodiment of a fitting unit 210 in a fitting apparatus for connecting pipes of the present invention.

The fitting unit 210 of another embodiment illustrated in FIG. 9 also includes a first body 210a and a second body 210b, and has a pipe insertion space S1 formed therein.

However, in the present embodiment, the first body 210a and the second body 210b are formed in a form in which an outer extension part is omitted. That is, in the present embodiment, the first body 210a and the second body 210b have a form in which an inner extension part 211, a second member mounting part 214, a groove separation part 213, and a first member mounting part 212 are sequentially connected to each other outward from the center of the fitting unit 210.

As such, the fitting unit 210 may be formed to have a shorter length by omitting the outer extension part.

FIGS. 10 to 13 are views illustrating other embodiments of compression members 220, 320, 420, and 520 in the fitting apparatus for connecting the pipes of the present invention.

In each embodiment illustrated in FIGS. 10 to 13, the compression members 220, 320, 420, and 520 have a common characteristic in which openings 221, 321, 421, and 521 are formed in a part of an entire circumference, respectively, to form an unfinished ring shape.

Here, in the case of the embodiment illustrated in FIG. 10, a longitudinal section of the compression member 220 is formed to have a main compression region 222 of a rectangular shape as a whole, and a longitudinal section of the compression member 320 of the embodiment illustrated in FIG. 11 is formed to have a main compression region 322 of a rhombic shape.

In addition, a longitudinal section of the compression member 420 of the embodiment illustrated in FIG. 12 is formed to have a main compression region 422 of a semicircular shape and an auxiliary compression region 424 protruding toward a center of the pipe insertion space of the fitting unit from the main compression region 422. The auxiliary compression region 424 may more strongly compress the first pipe or the second pipe.

In addition, a longitudinal section of the compression member 520 of the embodiment illustrated in FIG. 13 includes a main compression region 522 having an elongated semicircular end portion and an auxiliary groove 524 recessed inward from the main compression region. The auxiliary groove 524 is formed in a recessed shape and protrusions formed at both sides may more strongly compress the first pipe or the second pipe.

As such, the compression members 220, 320, 420, and 520 may be formed in various shapes.

FIGS. 14 to 17 are views illustrating other embodiments of sealing members 230, 330, and 430 in the fitting apparatus for connecting the pipes of the present invention.

In each embodiment illustrated in FIGS. 14 to 17, the sealing members 230, 330, 430, and 530 have elasticity, respectively, and have a common characteristic to be formed in a ring shape.

Here, in the embodiment illustrated in FIG. 14, the sealing member 230 includes an auxiliary sealing protrusion 236, and a longitudinal section thereof is formed to have a circular main sealing region 232 and an auxiliary sealing region 234 protruding toward the center of the fitting unit from the main sealing region 232.

In the embodiment illustrated in FIG. 15, the sealing member 330 is configured to include only a main sealing region 332 having a rectangular longitudinal section so that a surface in contact with the first pipe or the second pipe is flatly formed to more increase a contact area.

In the embodiment illustrated in FIG. 16, the sealing member 430 is formed to have a longitudinal section so that a pair of main sealing regions 432a and 432b are connected to each other and the pair of main sealing regions 432a and 432b are formed in a circular shape. In this case, a recessed connection groove 434 is formed between the pair of main sealing regions 432a and 432b, and accordingly, the sealing member 432 of the present embodiment forms a plurality of contact points with the first pipe or the second pipe to improve the water stop force.

Meanwhile, in FIG. 17, the sealing member 530 includes an auxiliary sealing protrusion 536 along the circumference as described above and a longitudinal section thereof is formed to include a main sealing region 532 having a circular shape, an auxiliary sealing region 534 protruding toward a center of the fitting unit 110 from the main sealing region 532, and wing parts 538 protruding to both sides about the auxiliary sealing region 534.

As illustrated in FIG. 17, a basic role is similar to those described above, but the auxiliary sealing region 534 protruding from the main sealing region 532 and the wing parts 538 have a plurality of contact points in each pipe and adhere to each other to improve the water stop force.

Here, the auxiliary sealing protrusion 536 may protrude so that the height of a central portion between the wing parts 538 is higher than the height of the wing parts 538 at both ends.

More specifically, in the present embodiment, in a region facing the pipe between the wing parts 538, the auxiliary sealing protrusion 536 has a protruding height increased toward the center and the auxiliary sealing protrusion 536 in a region in contact with the fitting unit 110 on the wing parts 538 is uniformly formed.

The auxiliary sealing protrusion 536 is formed in a spiral shape to pass through the main sealing region 532 and the auxiliary sealing region 534, but has a uniform protruding height in the main sealing region 532 and has a relatively high protruding height in the auxiliary sealing region 534.

Here, the protruding height is gradually increased toward the center of the auxiliary sealing region 536 from the wing parts 538 of the auxiliary sealing protrusion 536.

As such, the auxiliary sealing protrusion 536 of the sealing member 530 according to the present embodiment has a uniform protruding height in the main sealing region 532 and extends to the wing parts 538 to have no change in height. In the auxiliary sealing region 534, the height is linearly increased toward the center from both ends where the wing parts 538 are located.

As such, the auxiliary sealing protrusion 536 has a difference in protruding height depending on a location to be stably in contact with the pipe, thereby increasing the water stop force.

In addition, referring to FIG. 18, the sealing member 530 is deformed by receiving a pressure while provided between the pipe and the fitting unit. At this time, the auxiliary sealing protrusion 536 formed along the circumference of the sealing member 530 may be deformed to be in contact with the inner surface side of the second recessed groove 114a.

Accordingly, three contact points P1, P2, and P3 are formed on the inner surface of the second recessed groove 114a in the auxiliary sealing protrusion 536 formed over the circumference of the sealing member 530, and additionally, a contact point is formed by the deformation of the main sealing region 532.

On the contrary, in a portion corresponding to the auxiliary sealing region 534 between the wing parts 538, the auxiliary sealing protrusion 536 of the sealing member 530 forms only one contact point P4 in contact with the outer surface of the pipe. That is, in the case of the pipe, since only one point which is a part of the auxiliary sealing protrusion 536 protruding from the sealing member 530 is in contact with the pipe, it is necessary to further increase the strength of the auxiliary sealing protrusion 536 than those of other portions.

Accordingly, since the auxiliary sealing protrusion 536 is formed to be relatively higher than the main sealing region 532 in the auxiliary sealing region 534, the overall thickness becomes thick even if deformation due to compression occurs, thereby increasing the water stop force.

In addition, even if the sealing member 530 according to the embodiment of the present invention is a region without the auxiliary sealing protrusion 536, the sealing member 530 is in contact with the pipe by the auxiliary sealing region 534 and the wing parts 538 in multiple to be stably in contact with the pipe.

For this reason, in the present embodiment, the protruding height of the auxiliary sealing protrusion 536 is formed relatively high in the auxiliary sealing region 534 to improve the water stop force.

As such, the sealing members 230, 330, 430, and 530 may also be formed in various shapes.

FIGS. 19 to 20 are views illustrating other embodiments of pressing units 250 and 350 in the fitting apparatus for connecting the pipes of the present invention.

In the case of each embodiment illustrated in FIGS. 19 and 20, the pressing units 250 and 350 include pressing bodies 251 and 351 which have a fitting unit insertion space S2 formed therein and cover and press the outer circumferential surface of the fitting unit, and the pressing bodies 251 and 351 have a common characteristic in that first seating grooves 252 and 352 and second seating grooves 254 and 354 are formed along inner circumferential surfaces thereof.

Here, in the case of each embodiment illustrated in FIGS. 19 and 20, inner circumferential surfaces 253 and 353 of the first seating grooves 252 and 352 and the second seating grooves 254 and 354 are further recessed inwards. At this time, compared with the inner circumferential surface 253 of the first seating groove 252 and the second seating groove 254 illustrated in the embodiment of FIG. 19, there is a difference in that the inner circumferential surface 353 of the first seating groove 352 and the second seating groove 354 illustrated in the embodiment of FIG. 20 is formed in a more rounded shape.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A fitting apparatus for connecting pipes comprising:
  a fitting unit which includes a first body into which a first pipe is inserted and a second body which is connected to the first body to form a pipe insertion space therein together with the first body and into which a second pipe is inserted, wherein in the first body and the second body, a first recessed groove and a second recessed groove spaced apart inward from the first recessed groove are formed along an inner circumferential surface thereof, respectively,
  wherein the first body and the second body comprise:
    a first member mounting part having the first recessed groove formed on the inner circumferential surface thereof;
    a second member mounting part having the second recessed groove formed on the inner circumferential surface thereof;

a groove separation part formed between the first member mounting part and the second member mounting part; and an inner extension part which extends inward from the second member mounting part to connect the first body and the second body to each other;

a compression member which is provided in the first recessed groove to compress and fix the first pipe or the second pipe;

a sealing member which is provided in the second recessed groove to maintain airtightness between the fitting unit and the first pipe or between the fitting unit and the second pipe; and, a pressing unit which is mounted to cover an outer circumferential surface of the first body or the second body to press the outer circumferential surface of the first body or the second body, wherein the pressing unit comprises:

a pressing body which has a fitting unit insertion space into which the first body or the second body is inserted and covers and presses the outer circumferential surface of the first body or the second body; and a first seating groove on which the first member mounting part is seated, a second seating groove on which the second member mounting part is seated are formed along an inner circumferential surface thereof, and a predetermined space corresponding the groove separation part being formed between the first seating groove and the second seating groove, the predetermined space on which the groove separation part is seated, wherein the pressing body is in direct contact with the inner extension part, the second member mounting part, the groove separation part, and the first member mounting part, respectively.

2. The fitting apparatus for connecting the pipes of claim 1, wherein the first body and the second body further include an outer extension part extending outward from the first member mounting part.

3. The fitting apparatus for connecting the pipes of claim 1, wherein the first member mounting part and the second member mounting part are formed to have outer diameters larger than those of the groove separation part and the inner extension part.

4. The fitting apparatus for connecting the pipes of claim 1, wherein a length of the inner extension part is larger than the length of the groove separation part.

5. The fitting apparatus for connecting the pipes of claim 1, wherein the compression member is seated on the first recessed groove and formed to have a non-closed shape in which a part of the circumference is opened to reduce a diameter by compression applied to the outer circumferential surface of the fitting unit and compress the first pipe or the second pipe.

6. The fitting apparatus for connecting the pipes of claim 5, wherein a longitudinal section of the compression member includes a main compression region having a predetermined shape.

7. The fitting apparatus for connecting the pipes of claim 6, wherein the longitudinal section of the compression member further includes an auxiliary compression region protruding toward the center of the pipe insertion space from the main compression region.

8. The fitting apparatus for connecting the pipes of claim 6, wherein the longitudinal section of the compression member further includes an auxiliary groove recessed inward from the main compression region.

9. The fitting apparatus for connecting the pipes of claim 1, wherein the sealing member is formed to have elasticity to be seated on the second recessed groove and formed in a ring shape.

10. The fitting apparatus for connecting the pipes of claim 9, wherein the sealing member includes an auxiliary sealing protrusion protruding spirally along the outer surface of the sealing member.

11. The fitting apparatus for connecting the pipes of claim 9, wherein a longitudinal section of the sealing member includes a main sealing region having a predetermined shape.

12. The fitting apparatus for connecting the pipes of claim 11, wherein the longitudinal section of the sealing member further includes an auxiliary sealing region protruding outward from the main sealing region.

13. The fitting apparatus for connecting the pipes of claim 11, wherein the longitudinal section of the sealing member is formed so that a pair of main sealing regions is connected to each other.

* * * * *